Aug. 19, 1952     L. V. DAY     2,607,607
EMERGENCY TIRE TRUCK
Filed Aug. 12, 1947     2 SHEETS—SHEET 1
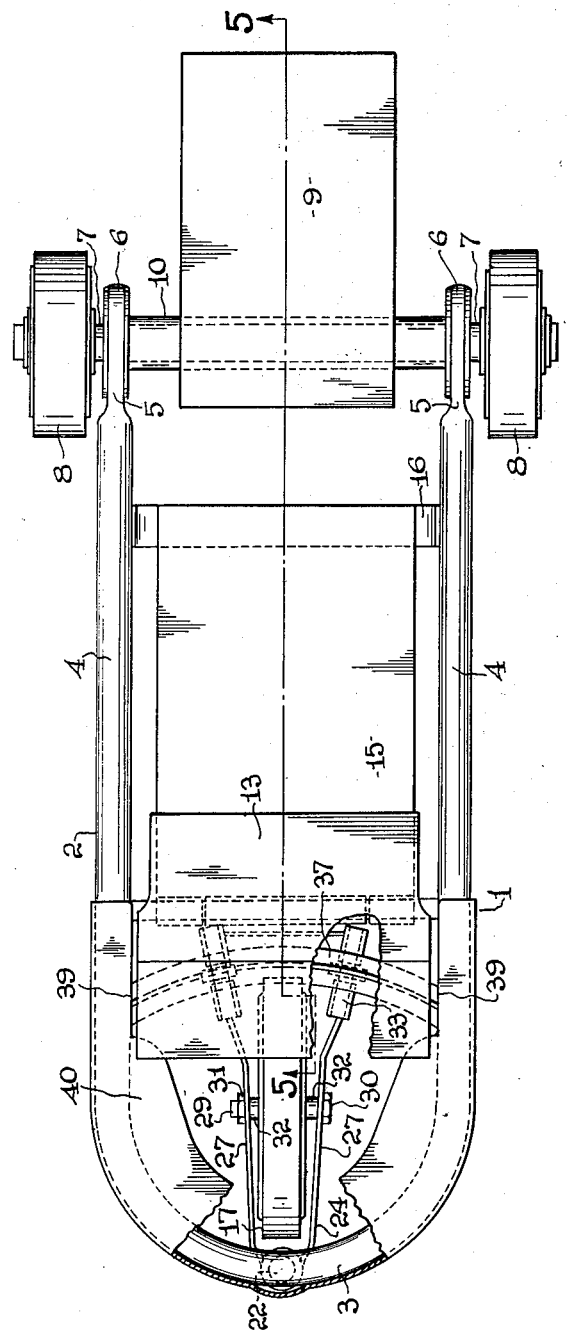
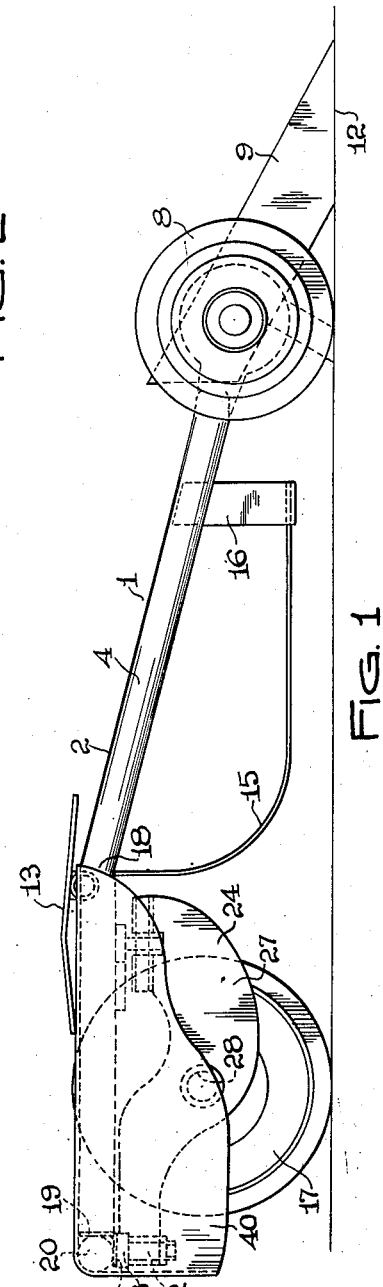
INVENTOR.
LUTHER V. DAY
BY
ATTORNEY.

INVENTOR.
LUTHER V. DAY

Patented Aug. 19, 1952

2,607,607

UNITED STATES PATENT OFFICE 2,607,607

EMERGENCY TIRE TRUCK

Luther V. Day, Gosport, Ind., assignor to National Tool and Die Company, Inc., Louisville, Ky., a corporation of Kentucky Application August 12, 1947, Serial No. 768,212

1 Claim. (Cl. 280—61)

This invention relates generally to devices which are utilized as tire substitutes to permit operation of a wheeled vehicle in the event that one of its pneumatic tires is accidentally deflated or punctured. More specifically, the present invention relates to improvements in the type of device commonly known as a "dolly."

Often drivers of automobiles or trucks have the misfortune of getting a punctured tire when they are remote from a garage or service station. Although the driver of an automobile can usually change the flat tire by replacing it with a spare tire, carried for that purpose, occasionally this remedy is either undesirable or unavailable. For example, many women drivers cannot change tires on an automobile; often a truck driver does not carry the necessary equipment which is required for changing tires; the spare tire may have been previously punctured and not yet repaired; the driver cannot or does not want to bother replacing the tire.

In any of the examples given, the driver must either attempt to obtain assistance, which may be a long time in coming, or he may attempt to travel on the deflated tire, thereby injuring the tire.

It is a primary object of the present invention to provide a device which will permit the vehicle to be driven without injury to the punctured tire, thereby making it possible for the driver to reach a garage or service station where the tire may be repaired.

Another object of the invention is to provide such a device which can be utilized without the use of any tools or additional equipment.

Still another object of the present invention is to provide a device of the character described, which is adapted to raise the wheel of a vehicle and thus maintain and carry the deflated tire above the road surface.

A further object of the invention is to provide such a device which is adapted to conform to changes in the direction of movement of the vehicle so as to permit proper steering of the vehicle.

A still further object of the invention is to provide a device of the character described which is sturdily and simply constructed.

Other objects and advantages of my invention will become apparent during the course of the following description and with reference to the annexed drawings forming a part thereof.

In the accompanying drawings, forming a part of this specification, and in which like numerals are used to designate like parts throughout the same, Fig. 1 is a side elevation of a dolly embodying the features of my invention.

Fig. 2 is a plan view of the dolly, with certain portions broken away to more clearly show the mounting arrangement of the front wheel of the dolly.

Figure 3:
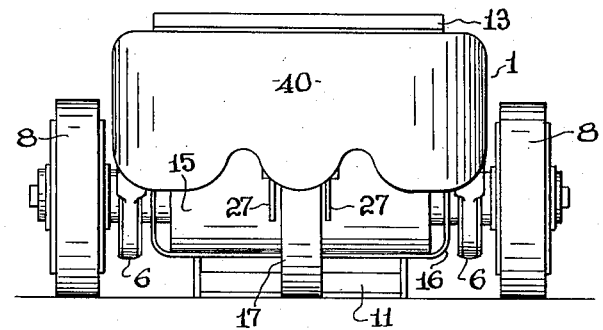
Fig. 3 is a front elevation of the dolly.
Figure 4:
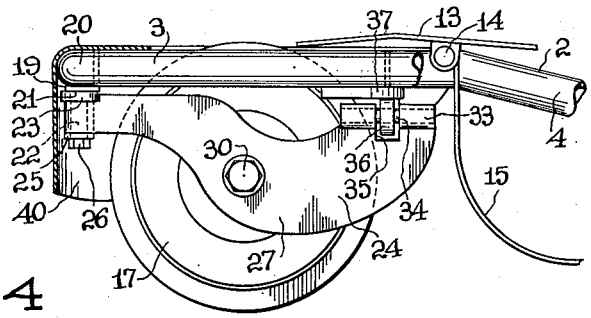
Fig. 4 is a fragmental side elevation of the dolly with the skirt removed to show details of the front wheel structure.

The dolly, which is designated generally by the numeral 1, has a U-shaped tubular frame 2, the midportion of the U forming the front 3 of the dolly and the legs of the U extending rearwardly to form the sides 4 of the frame.

The ends 5 of the sides are flattened and shaped to form bearing members 6 in which the ends of an axle 7 are journalled. Two rear wheels 8 are mounted for independent rotation on the opposite ends of the axle 7.

In order that the wheel of the automobile or truck may be driven onto the dolly, a ramp 9 is provided between the rear wheels 8 of the dolly, the ramp being fastened to an annular sleeve 10 which is rotatably carried by the axle 7 and is disposed between the bearing members 6. An auxiliary supporting member 11 is fastened to the underside of the ramp 9 in a position normal to the surface of the ramp, so as to engage the road surface in spaced relationship to a beveled edge 12 of the ramp.

The member 11 intersects the road surface at an acute angle and in a forward direction so as to retard the tendency of the dolly to move forwardly when the wheel of the vehicle is moving up the ramp 9.

Figure 5:
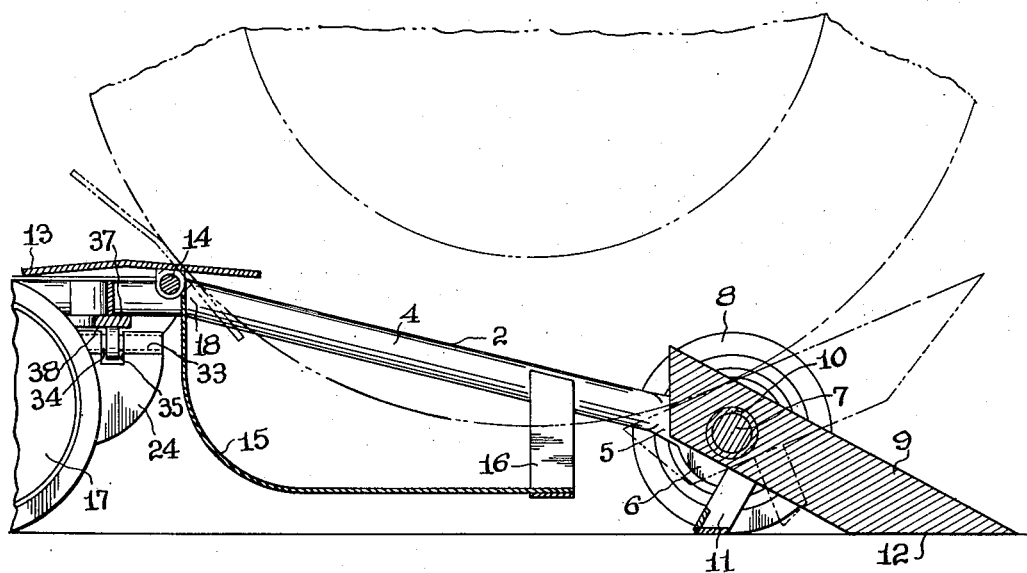
Fig. 5 is a cross-sectional view taken on line 5—5 of Fig. 2 and showing the outline of a tire as supported by the dolly.

As the wheel of the vehicle moves up the ramp, the weight of the vehicle forces the ramp to rotate from the position shown in solid lines in Fig. 5 to the position shown in dotted lines, the surface of the ramp 9 assuming a position tangential to the surface of the tire and supporting the rear of the tire and wheel above the road surface.

The front portion of the tire engages and is supported by a plate 13 which is mounted for pivotal movement about a cross-bar 14 which is rigidly secured to each side 4 of the frame 2. When engaged by the tire, the plate 13 is rotated from the position shown in solid lines in Fig. 5 to the position shown in dotted lines.

The cross-bar 14 also serves as a support for one end of a shield 15 which is supported at its other end by a carrier strip 16 which is fastened to each side 4 of the frame 2 ahead of the wheels 8. The shield 15 has a dual function in that it acts as a secondary support for the wheel of the vehicle if the tire should be of a size small enough to pass between the ramp 9 and the plate 13, and, secondly, the shield 15 prevents road obstructions from hitting the tire and possibly jarring the wheel of the vehicle out of the dolly 1.

In order to make the dolly completely responsive to changes in the direction of travel of the vehicle, a unique mounting structure is provided for a guide wheel 17, which structure not only is conducive to free pivotal movement of the guide wheel, but also permits the guide wheel 17 to be of a diameter sufficiently large to provide for good road travel while maintaining the overall height of the frame 2 at a proper level with respect to the other wheels of the vehicle.

The sides 4 of the frame 2 are bent as at 18 so as to incline downwardly and rearwardly toward the axle 7. The front 3 of the frame 2 is higher than the height of the rear wheels 8 and the guide wheel 17 is larger in diameter than either of the rear wheels 8.

An angle bracket 19 is mounted on the front 3 of the frame as at 20, and to undersurface 21 of the angle bracket is welded a king-pin 22 which extends vertically downward from the frame 2. A thrust bearing 23 is mounted on the king-pin 22 adjacent the undersurface 21 of the angle bracket, and a yoke member 24 is pivotally mounted on the king-pin 22, being held firmly againsst the thrust bearing 23 by a washer 25 and a lock nut 26 which is threaded onto the king-pin.

The legs 27 of the yoke 24 have aligned openings 28 provided therein in which are journalled the ends of an axle member 29. The axle 29 is held in position by an upset head 30 on one end thereof and a nut 31 on the other end thereof. The guide wheel 17 is mounted on the axle 29 and is held in spaced relationship between the legs 27 of the yoke 24 by annular spacers 32.

The ends of each of the legs 27 of the yoke 24 terminate in cylindrical portions 33 which are adapted to retain a pin 34. The portions 33 are partially cut away to provide recesses 35 which permit a roller in the form of a ball bearing 36 to be rotatably carried by the pin 34. The ball bearings 36 engage and travel upon the flat undersurface 38 of an arcuate ribbed track 37 which is fastened to each side 4 of the frame 2 as at 39.

Thus the guide wheel 17 is pivotally mounted for rotation about the king-pin 22, and the load on tthe wheel 17 is prevented from causing a leverage or binding action on the king-pin 22 by providing the additional guide wheel supports on the ends of the yoke legs 27, thereby effectively supporting the yoke 24 at three spaced points. Each of the rear wheel 8 and the guide wheel 17 are provided with anti-friction bearings and each of the wheels 8 and 17 are provided with pneumatic or semi-pneumatic tires.

A protective bumper skirt 40 is mounted on the front 3 and partially along the sides 4 of the frame 2 to prevent injury to the guide wheel assembly.

It is readily apparent that I have provided a device which makes it possible for the driver of a vehicle which has a punctured tire, to drive his vehicle to a garage or service station without causing further injury to the tire.

The mounting of the guide wheel 17 provides for free, non-binding pivotal movement of the guide wheel and results in the dolly being quickly and easily responsive to changes in the direction of travel of the vehicle.

It will be noted that the dolly can be employed, for the purpose intended, without the use of any additional tools or equipment and that it is sturdily constructed so as to retain the vehicle wheel in positive engagement.

It is to be understood that the form of my invention, herewith shown and described, is to be taken as a preferred example of the same, and that various changes in the shape, size and arrangement of parts may be resorted to, without departing from the spirit of my invention or the scope of the subjoined claim.

Having thus described my invention, I claim:

In a dolly for a vehicle wheel, the combination of a frame, vehicle wheel supporting members carried by said frame, and three wheels for supporting the frame, said frame at the forward end thereof having a depending king-pin, a one-piece, sheet metal, U-shaped yoke carried by said pin for pivotal movement therearound in a horizontal plane and carrying a wheel thereon, journalled in the yoke intermediate the ends thereof said yoke having the closed end of the U embracing said king-pin and its free ends extending rearwardly, rollers, said free ends having slots at their upper edges to receive said rollers and the said free ends on opposite sides of the rollers being bent upon themselves to form cylindrical bearings receiving supporting shafts for said rollers, and a track on said frame engaged by said rollers.

LUTHER V. DAY.

REFERENCES CITED

The following references are of record in the file of this patent:

UNITED STATES PATENTS

| Number | Name | Date |
| --- | --- | --- |
| 713,626 | French | Nov. 18, 1902 |
| 1,482,105 | Andrews et al. | Jan. 29, 1924 |
| 1,536,611 | Duke | May 5, 1925 |
| 1,777,694 | Halteman | Oct. 7, 1930 |
| 2,350,118 | Knapp | May 30, 1944 |

FOREIGN PATENTS

| Number | Country | Date |
| --- | --- | --- |
| 239 | Great Britain | Jan. 24, 1872 |
| 108,226 | Switzerland | Feb. 18, 1924 |
| 234,266 | Great Britain | May 28, 1925 |